3,364,235
PHTHALIC ANHYDRIDE COLOR INHIBITION
Thomas A. Bloom, Park Forest, Ill., assignor to The Sherwin-Williams Company, Cleveland, Ohio, a corporation of Ohio
No Drawing. Filed Jan. 3, 1966, Ser. No. 517,911
7 Claims. (Cl. 260—346.7)

This invention relates to phthalic anhydride color inhibition and more particularly to the reduction of color formation in the distillation and storage of phthalic anhydride. The invention is especially concerned with the reduction of color formation in distilled molten phthalic anhydride stored in the presence of iron.

One of the problems in the preparation of phthalic anhydride is the minimizing of color formation in molten distilled phthalic anhydride, especially phthalic anhydride distilled in the presence of iron, for example, where the distillation is conducted in vessels made from or containing iron. Another problem is the color formation which occurs when molten phthalic anhydride is stored in the presence of iron.

It would be desirable if a method were found for reducing color formation in molten distilled phthalic anhydride and especially molten distilled phthalic anhydride distilled in the presence of iron and/or stored in the presence of iron.

One of the objects of this invention is to provide distilled molten phthalic anhydride compositions which can be stored in the molten state under an inert atmosphere without substantial color formation.

A further object of the invention is to provide molten phthalic anhydride compositions which are inhibited against color formation in the presence of iron.

Another object of the invention is to provide a new and improved method for inhibiting color formation in phthalic anhydride during distillation.

A more specific object of the invention is to provide a new and improved method for inhibiting color formation in phthalic anhydride during distillation in the presence of iron. Other objects will appear hereinafter.

In accordance with the invention it has been found that metals and compounds of certain metals, namely, calcium, barium, zinc, cadmium, silver and lead, inhibit color formation in molten phthalic anhydride. These inhibitors are preferably used in the form of their oxides and zinc oxide has been found to be especially effective. The free metals are less desirable because on distillation of the molten phthalic anhydride they tend to produce bumping. Some of the metals are not readily available in metallic form. Others, such as zinc dust, can be used but have the foregoing disadvantage. Furthermore, a compound of the metal is preferred and especially one which is wetted by molten phthalic anhydride. Zinc oxide is especially suitable because it is wetted by molten phthalic anhydride and does not cause the problem of bumping during distillation.

The quantity of the inhibitor employed is subject to variation but is preferably a fraction of a percent based on the weight of phthalic anhydride. In most cases, effective results are obtained within a range of 0.1% to 0.5% by weight.

The invention will be further illustrated but is not limited by the following examples in which the quantities are stated in parts by weight unless otherwise indicated.

*Example I*

A series of tests was carried out with various metal oxides which were added to crude phthalic anhydride in a proportion of 0.5% based on the weight of the crude phthalic anhydride. A control was also used in which no addition was made. The crude phthalic anhydride was obtained in a conventional commercial process by the oxidation of naphthalene.

The distillation procedure used was conventional for the distillation of molten phthalic anhydride, the temperature of the molten phthalic anhydride being around 200° C. at 80 mm. pressure.

The first cut was taken from each distillate identical in amount. The molten phthalic anhydride was then distilled to dryness.

The color of the first fraction and the color of the distilled product was measured in APHA color units using ASTM method D2280–64T. The distilled product was then stored in the presence of iron and the color was measured again in the same manner after 70 hours.

The results are given in the following table.

TABLE I

| Oxide | First fraction | Color of distilled product | Color of molten product stored in presence of iron after 70 hours |
|---|---|---|---|
| MgO | 60 | 20 | 200 |
| CaO | 60 | 20 | 50 |
| SrO | 30 | 15 | 100 |
| BaO | 40 | 20 | 30 |
| ZnO | 10 | 10 | 15 |
| CdO | 40 | 20 | 35 |
| $Ag_2O$ | 50 | 20 | 20 |
| PbO | 30 | 20 | 50 |
| Control | 60 | 25 | 100 |

The first fraction corresponded to 4% to 8% of the total distilled product. It will be seen from the foregoing table that all of the metal oxides tested gave some improvement to the color of the distilled product as compared with the control. However, on storage this improvement was not maintained in the case of magnesium oxide and strontium oxide and the amount of improvement was greater with zinc oxide than with any of the other remaining oxides.

*Example II*

Phthalic anhydride was distilled as described in Example I with the addition of various oxides and in one case without the addition of any additive. The original color of the distilled molten phthalic anhydride was measured in the same manner described in Example I. The distilled molten phthalic anhydride was then stored at a temperature of 135° C. under nitrogen for a period of 70 hours with and without the addition of two iron nails. A control was also run in each case.

The results are given in the following table.

TABLE II

| Oxide | Original Color | Color at End of 70 hours at 135° C. | |
|---|---|---|---|
| | | With Nails | Without Nails |
| MgO | 20 | 200 | 20 |
| CaO | 25 | 50 | 25 |
| SrO | 15 | 100 | 25 |
| BaO | 20 | 30 | 25 |
| ZnO | 10 | 10 | 10 |
| CdO | 20 | 35 | 20 |
| $Ag_2O$ | 20 | 20 | 20 |
| PbO | 25 | 50 | 25 |
| Control | 25 | 100 | 25 |

From the foregoing examples it appears that there are two effects brought about by the use of the additives, namely, (1) reduction in the color in the first fraction, and (2) a decrease in the color forming bodies that cause color to form in the presence of iron. The oxides which are effective for (1) are zinc oxide, strontium oxide, lead oxide, barium oxide and cadmium oxide. The oxides which are effective for (2) are zinc oxide and silver oxide.

Considering (1) and (2) together it will be seen that zinc oxide is unique among all the oxides tested when consideration is given to its color inhibiting qualities. Magnesium oxide and strontium oxide were ineffective to reduce the color forming bodies in the presence of iron.

*Example III*

The procedure was the same as in Example I except that only zinc oxide, metallic zinc, calcium oxide and mixtures of zinc and zinc oxide were used as additives in varying proportions. The molten phthalic anhydride to which the additive was added was a crude phthalic anhydride.

The results are shown in the following table.

TABLE III

| Additive | Melt Color of Distilled Product | Melt Color of Distilled Product after 48 Hrs. in Contact with Iron at 135–140° C. |
|---|---|---|
| 0.5% ZnO | 10 | 10 (control goes to 200). |
| 0.5% Zn | 10 | 20 (same control as above). |
| 0.5% Zn | 10 | 20 (same control as above). |
| 1% ZnO | 10 | 15 (control goes to 60). |
| 0.5% CaO | 20 | 100 (control goes to 200). |
| 0.5% ZnO | 10 | 10 (control goes to 60). |

It will be seen from Example III that metallic zinc is effective for the purpose of the invention although as previously indicated, it is preferable to use zinc oxide.

While the invention is not limited to any theory, it is believed that the effective additives react with impurities present in the crude phthalic anhydride to form compounds which are not distilled during the distillation of the phthalic anhydride so that the distilled phthalic anhydride no longer contains these impurities. For example, one type of impurity which has been found to be present is bromine or a bromine-containing compound. It appears probable that zinc oxide reacts with such compounds to give salts which are stable at the temperature of distillation. No explanation can be given for the color inhibition in the presence of iron. In any case, regardless of the explanation, it has been possible in accordance with the invention to inhibit color formation in molten phthalic anhydride, even in the presence of iron, and it has been possible to reduce color formation when phthalic anhydride is distilled. By reducing the color of the first fraction distilled it is possible to recover more saleable product. Heretofore, color formation when the distilled product was stored in iron vessels has been a problem. The present invention overcomes this problem.

The invention is hereby claimed as follows:

1. A process for inhibiting color formation in molten distilled phthalic anhydride which comprises adding to crude phthalic anhydride which is prepared by a conventional process of oxidizing naphthalene, a color inhibitor from the class consisting of calcium, barium, zinc, cadmium, silver and lead, and oxides thereof, in an amount of a fraction of one percent effective to inhibit color formation when the phthalic anhydride is distilled, and thereafter distilling the phthalic anhydride while said color inhibitor is present in the molten phthalic anhydride being subjected to distillation.

2. A process as claimed in claim 1 in which the additive is an oxide.

3. A process as claimed in claim 1 in which the additive is zinc oxide.

4. A process as claimed in claim 1 in which the amount of the additive is within the range of about 0.1% to 0.5% by weight of the phthalic anhydride.

5. A process as claimed in claim 1 in which the distillation is carried out in the presence of iron.

6. In a process for the purification of crude phthalic anhydride containing impurities from the class consisting of bromine and bromine-containing compounds, the steps which comprise adding to said crude phthalic anhydride a color inhibitor from the class consisting of calcium, barium, zinc, cadmium, silver and lead, and oxides thereof, in an amount of a fraction of one percent effective to inhibit color formation when the phthalic anhydride is distilled, and thereafter distilling the phthalic anhydride while said color inhibitor is present in the molten phthalic anhydride being subjected to distillation.

7. A process as claimed in claim 6 in which the color inhibitor is zinc oxide.

References Cited

UNITED STATES PATENTS 2,510,852   6/1950   Bailey et al. _____ 260—346.7

NICHOLAS S. RIZZO, *Primary Examiner.*

UNITED STATES PATENT OFFICE
CERTIFICATE OF CORRECTION

Patent No. 3,364,235                                January 16, 1968

Thomas A. Bloom

It is certified that error appears in the above identified patent and that said Letters Patent are hereby corrected as shown below:

Column 3, TABLE III, first column, line 4 thereof, "1% ZnO" should read -- .1% ZnO --.

Signed and sealed this 28th day of October 1969.

(SEAL)
Attest:

Edward M. Fletcher, Jr.
Attesting Officer

WILLIAM E. SCHUYLER, JR.
Commissioner of Patents